United States Patent
Vialard et al.

(10) Patent No.: US 7,137,361 B2
(45) Date of Patent: Nov. 21, 2006

(54) CYLINDER HEAD GASKET WITH ONE-WAY COOLANT FLOW VALVE

(75) Inventors: Daniel J. Vialard, Novi, MI (US); Bhawani Tripathy, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/157,539

(22) Filed: Jun. 21, 2005

(65) Prior Publication Data

US 2005/0279295 A1 Dec. 22, 2005

Related U.S. Application Data

(60) Provisional application No. 60/581,898, filed on Jun. 22, 2004.

(51) Int. Cl.
*F01P 7/14* (2006.01)
*F02B 77/08* (2006.01)

(52) U.S. Cl. ............................. 123/41.08; 123/198 D (58) Field of Classification Search ............ 123/198 D, 123/41.08
See application file for complete search history.

(56) References Cited

U.S. PATENT DOCUMENTS

| | | | | |
|---|---|---|---|---|
| 5,004,464 | A | 4/1991 | Leise, Jr. ..................... | 604/338 |
| 5,022,662 | A | 6/1991 | Yasui ..................... | 277/235 B |
| 6,305,420 | B1 | 10/2001 | Atkinson et al. ........... | 137/846 |
| 6,659,094 | B1 | 12/2003 | Nakamizo et al. .......... | 123/572 |
| 6,662,791 | B1 | 12/2003 | Nakamizo et al. .......... | 123/572 |

*Primary Examiner*—Noah P. Kamen
(74) *Attorney, Agent, or Firm*—Robert L. Stearns; Dickinson Wright PLLC (57) ABSTRACT

A head gasket (48) which acts, when clamped between a cylinder head (28) and a block (22) in a liquid cooled internal combustion engine (20), to form a seal around the combustion chambers (24). A coolant flow path (32) routes through the engine (20) and its directed, in part, through the cylinder head (28) and the block (22), with a corresponding flow opening (54) formed in the head gasket (48) to accommodate flow of liquid coolant in a normal direction. The head gasket (48) includes a one-way valve (58) positioned in the flow opening (54) to allow the flow of coolant in a normal direction but to prevent the flow of liquid coolant through the flow opening (54) in an abnormal, reverse direction. The one-way valve (58) includes movable gate (66) which may be biased against a valve seat (64) in a normally closed condition. The one-way valve (58) can be made as a loose piece article of manufacture which is held in flow opening (54) by self-locking retention clips.

21 Claims, 5 Drawing Sheets

CYLINDER HEAD GASKET WITH ONE-WAY COOLANT FLOW VALVE

CROSS-REFERENCES TO RELATED APPLICATIONS

This patent application claims priority to U.S. Provisional Patent Application Ser. No. 60/581898, filed Jun. 22, 2004.

FIELD OF THE INVENTION

The invention relates to a method and assembly for preventing abnormal coolant flow in an internal combustion engine, and more particularly toward an improved head gasket having an integrated one-way flow control valve.

DESCRIPTION OF THE RELATED ART

Head gaskets act, when clamped between the cylinder head and the block of an internal combustion engine, to form seals around the cylinder bores. Head gaskets also provide openings for coolant flow paths and lubrication passages between the cylinder head and the block. The prior art includes various configurations of head gaskets which incorporate either mechanically or thermostatically operated valves mounted on the gasket body to control the flow of liquid between the cylinder head and the block. Such prior art gaskets are also known to include a check valve mounted on the gasket body to allow lubricant flow toward the cylinder head but to prevent lubricant flow toward the block for the purpose of retaining oil in the head to help with cold-starting lubrication.

The prior art also includes examples of cylinder head gaskets including reed-type breather valves for the purpose of venting a crank case. These breather valves usually connect a crank case to a rocker arm chamber and assist with crank case ventilation to the intake valve.

Most internal combustion engines for vehicular applications include a liquid cooling system characterized by a circuitous flow path throughout the engine, with certain passages strategically routing between the cylinder head and block. Such cooling systems also include external heat exchanging devices to properly manage the operating temperature of the engine and provide passenger compartment heat. In modern engines, it is common to incorporate multiple flow control valves in various locations in the cooling system. For example, a temperature sensitive valve, or thermostat, can be positioned in the flow path so that during cold-weather start-up, coolant will not circulate through the radiator but may circulate through the engine block. In other situations, it may be desirable to close certain valves so that coolant circulates through the heater core but does not circulate through the engine block until a specified temperature has been achieved. Other advance flow control situations are also possible with the incorporation of multiple flow control valves in the cooling system. Depending upon the combination of flow control valves actuated, it is possible to inadvertently establish an abnormal direction of coolant flow through the cooling system. This abnormal direction of flow is sometimes referred to as reverse coolant flow, and depending on the engine design can arise in the region between the cylinder head and the block. Reverse coolant flow is undesirable, and in some situations can result in damage to the engine components.

SUMMARY OF THE INVENTION AND ADVANTAGES

The subject invention comprises a head gasket for clamped retention between a cylinder head and a cylinder block in an internal combustion engine. The head gasket comprises a gasket body having at least one cylinder bore opening formed in the gasket body. At least one coolant flow opening is disposed in the gasket body for passing liquid coolant between the cylinder head and the block when the liquid coolant is flowing in a circuitous normal direction. The improvement comprises a one-way valve carried on the gasket body and automatically closing the coolant flow opening to prevent flow of the liquid coolant in an abnormal direction.

The subject invention overcomes the undesirable occurrence of reverse coolant flow by providing a one-way valve directly on the gasket body which functions to allow coolant flow in the normal direction but to prevent coolant flow in an abnormal direction.

According to another aspect of the invention, a liquid cooled internal combustion engine comprises a block having at least one combustion chamber formed therein. A cylinder head is fixed to the block and covers the combustion chamber. A coolant system is integrated into the block and the cylinder head. The coolant system includes a circuitous flow path passing through the cylinder head and the block. A pump, in communication with the flow path, influences the movement of cooling liquid in the coolant system to circulate in a normal direction. At least one flow control valve is disposed in the flow path for selectively preventing the circulation of liquid in portions of the coolant system. A gasket body is compressed between the cylinder head and the cylinder block. The gasket body includes at least one cylinder bore opening aligned with the combustion chamber and at least one coolant flow opening aligned with the flow path. The improvement comprises a one-way valve carried on the gasket body and automatically closing the coolant flow opening to prevent flow of the liquid coolant in an abnormal direction while allowing the flow of the liquid coolant therethrough in the normal direction.

According to yet another aspect of the invention, a method for preventing abnormal coolant flow in an internal combustion engine is provided. The method comprises the steps of providing an engine having a circuitous coolant flow path passing through a cylinder head and a block, circulating liquid coolant through the flow path in a normal direction, compressing a head gasket between the cylinder head and the block to contain combustion gases, forming a coolant flow opening in the head gasket aligned with the flow path to permit the movement of liquid coolant therethrough in the normal direction, and automatically blocking the flow opening with a one-way valve carried on the head gasket to prevent coolant flow through the engine in an abnormal direction.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
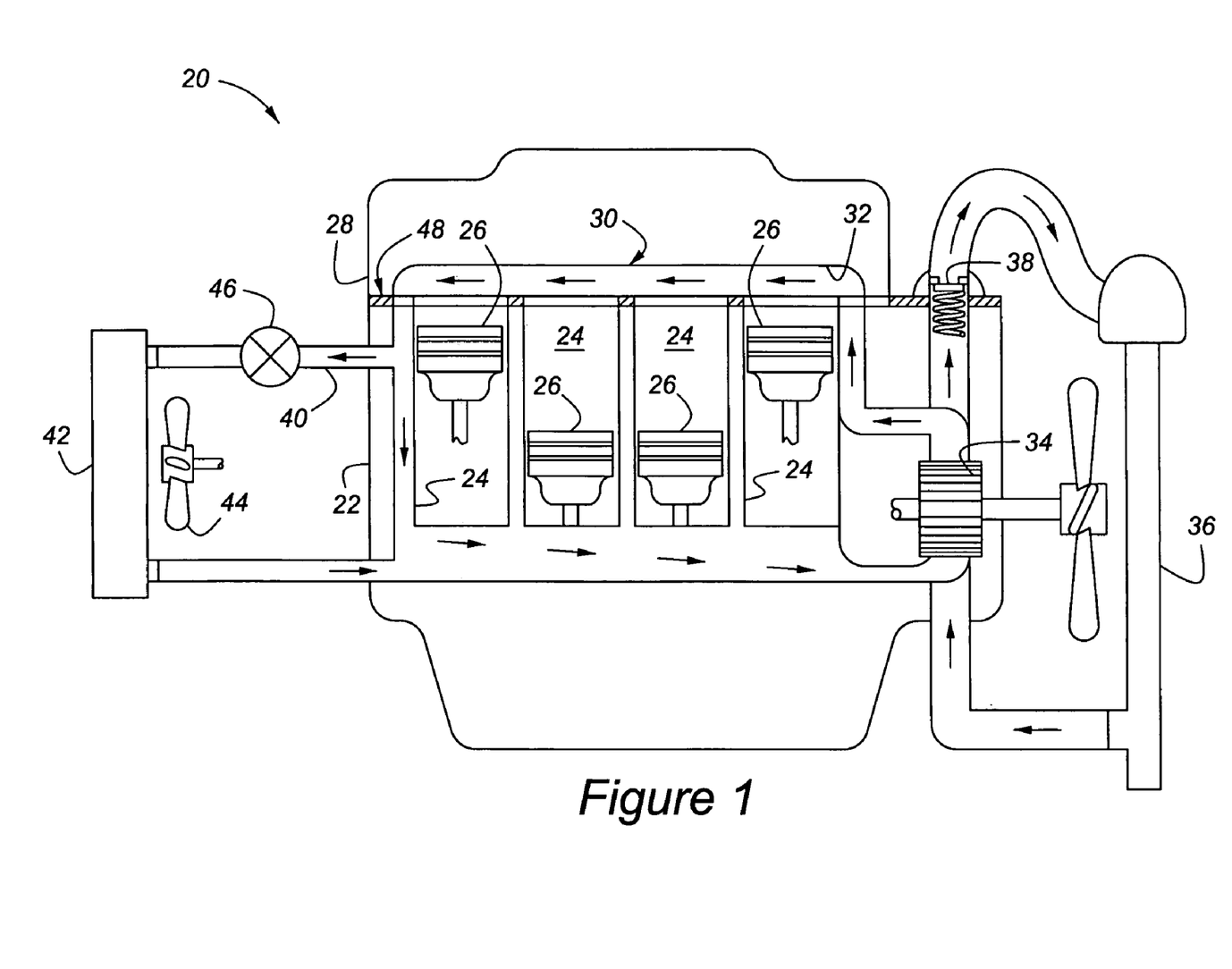
FIG. 1 is a simplified schematic view of an internal combustion engine having a cooling system.

Referring to the figures, wherein like numerals indicate like or corresponding parts throughout the several views, a simplified schematic of a liquid cooled internal combustion engine is generally shown at 20 in FIG. 1. The engine 20 includes a block 22 having a plurality of combustions chambers 24 formed therein. A piston 26 reciprocates in each combustion chamber 24 through two or four strokes to produce power through a combustion process which generates considerable heat as a byproduct. A cylinder head 26 is fixed to the block 22 and covers each of the combustion chambers 24 to seal in combustion gases.

To manage the considerable heat generated through the combustion process, a cooling system, generally indicated at 30, is provided with portions integrated into the block 22 and the cylinder head 28. The cooling system 30 includes a circuitous flow path 32 through which liquid coolant is routed from the cylinder head 28 to the cylinder block 22 under the influence of a pump 34. Excess heat in the cooling liquid can be removed through a heat exchanging radiator 36. When the engine 20 temperature is low, such as during start-up or extreme cold weather conditions, a flow controlling valve in the form of a thermostat 38, selectively prevents the circulation of liquid coolant into the radiator 36. By this method, the thermostat 38 helps manage the operating temperature of liquid coolant in the cooling system 30.

The cooling system 30 can also include a heater core circuit in which a take-off line 40 directs liquid coolant to a heater core 42. A heater fan 44 uses convection to transfer heat from the heater core 42 into the passenger compartment of the vehicle. A heater valve 46 can be incorporated into the take-off line 40 or in another advantageous location, for the purpose of controlling the flow of liquid coolant to the heater core 42. For example, during hot weather operation, it may be desirable to prevent any liquid coolant flow to the heater core 42.

Although not shown, other flow control valves may be incorporated into the flow path 32 at different locations to better manage engine temperature and the heat energy contained in the coolant system. For example, the flow path 32 can be designed to provide a flow control valve or valves which allow liquid coolant to circulate through the heater core 42 without circulating through the cylinder head 28 or around the combustion chambers 24 in the block 22. Such a condition may be motivated by the desire to direct all available heat energy to the heater core 42 where it can warm the passenger compartment as a first priority. Other, more sophisticated flow control strategies may be implemented as well.

However, during such sophisticated control of the movement of liquid coolant though the flow path 32, a possible undesirable reversal of coolant flow is possible. This reverse, or abnormal coolant flow direction can undermine proper management of engine temperatures and in extreme circumstances cause damage to components of the engine.

Figures 2, 3:
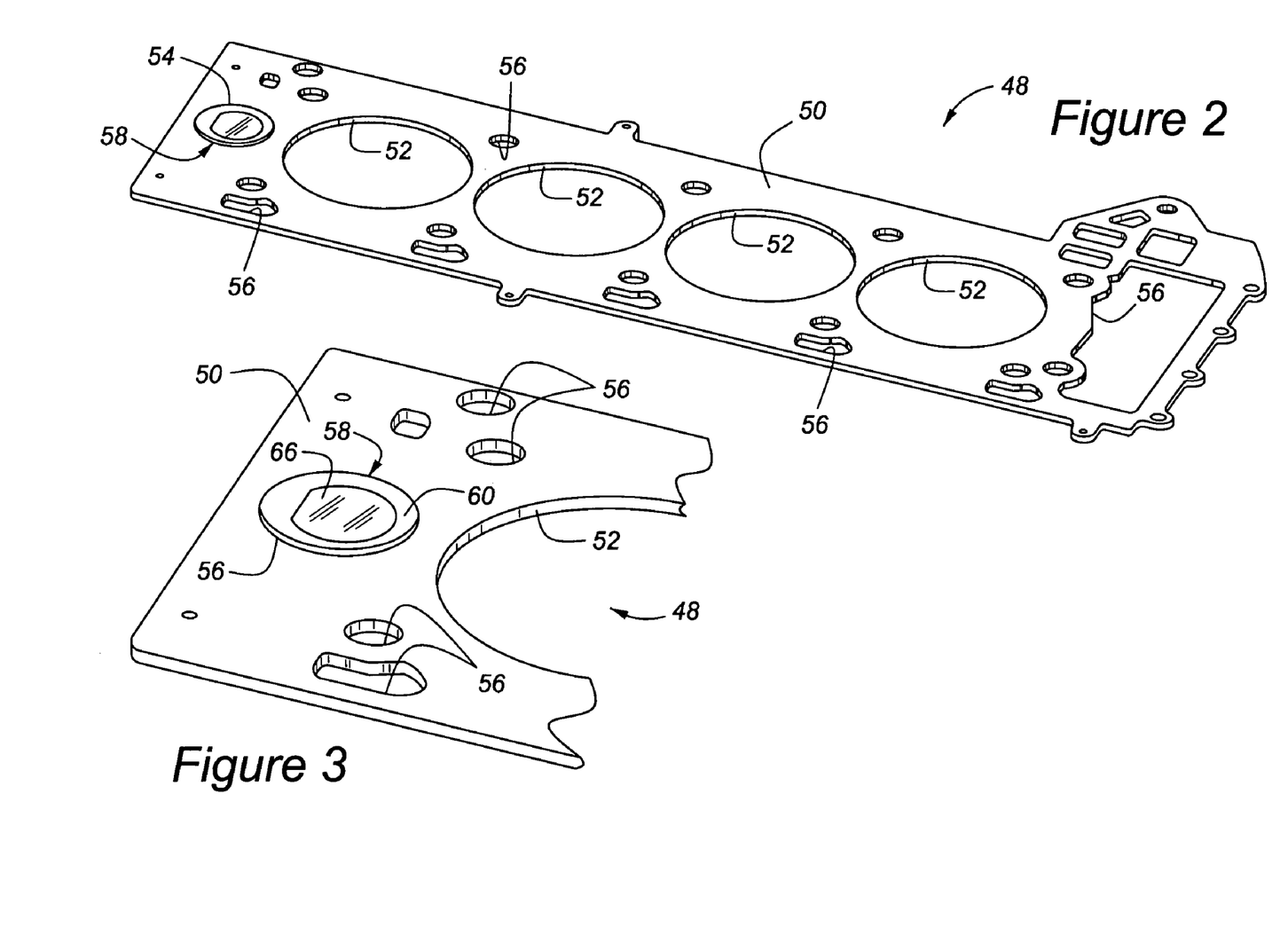
FIG. 2 is a perspective view of a cylinder head gasket according to the subject invention.
FIG. 3 is a fragmentary perspective view showing a portion of the head gasket including a one-way valve in the closed condition.
Figure 4:
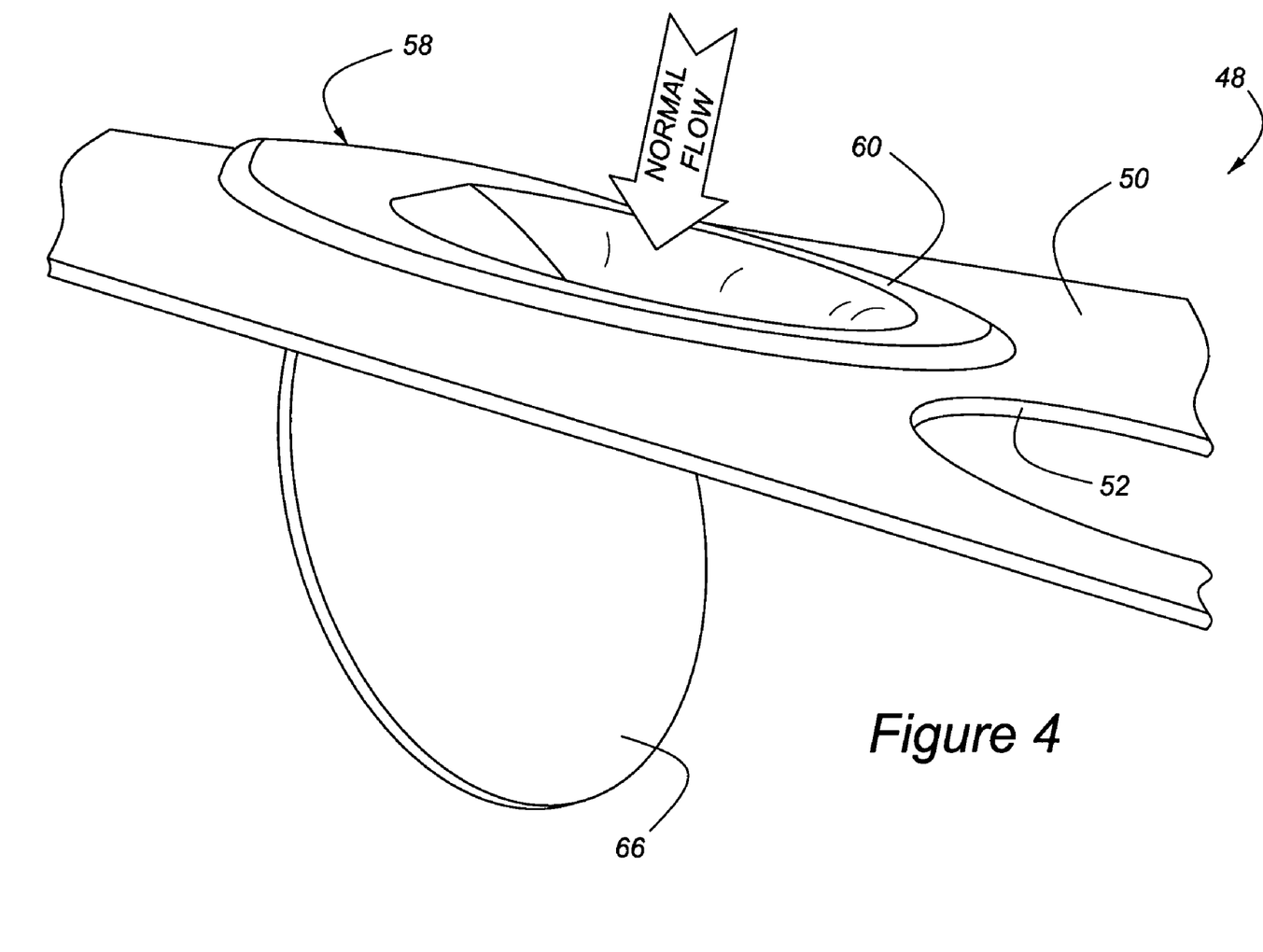
FIG. 4 is a fragmentary perspective view of the one-way valve in an open condition.

A head gasket, generally indicated at 48, is compressed between the cylinder head 28 and the block 22 for containing combustion gases within the combustion chamber 24. The head gasket 48 includes a gasket body 50, best shown in FIGS. 2 through 4. The gasket body 50 is of generally flat construction and fabricated from any of the known materials, for example, multi-layer steel (MLS), graphite, fiber, steel-elastomer, etc. The shape of the gasket body 50 is designed to correspond with the shape of the block 22 and cylinder head 28 as is generally known in the art. The gasket body 50 includes a cylinder bore opening 52 associated with each combustion chamber 24 to contain air/fuel and combustion gases during the engine cycles. At least one, coolant flow opening 54 is formed in the gasket body 50 and aligned with that portion of the flow path 32 which passes between the cylinder head 28 and the block 22. Thus, as liquid coolant moves through the flow path 32, the flow opening 54 in the gasket body 50 accommodates the free circulation. The gasket body 50 may further include additional openings 56 for various purposes, such as lubricating oil flow between the cylinder head 28 and the block 22, push rods, fastening bolts, and the like.

In most modern engines, liquid coolant in circulated in a normal direction through the flow opening 54 from the cylinder head 28 into the block 22. This normal direction takes advantage of gravity and also places the lowest temperature liquid coolant proximate the highest temperature components in the engine. However, it is equally possible to design the engine 20 so that the normal flow direction through the flow opening 54 is from the block 22 toward the cylinder head 28. In order to prevent coolant flow through the flow path 32 in an abnormal direction, i.e., from the block 22 into the cylinder head 28 in this example, a one-way valve, generally indicated at 58, is carried on the gasket body 50. The one-way valve 58 automatically closes the coolant flow opening 54 to prevent the flow of liquid coolant in an abnormal direction while allowing the flow of liquid coolant there through in the normal direction. Thus, if the various flow control valves in the coolant system 30 are set in a configuration which might allow or inadvertently encourage circulation of the coolant in a reverse circuit 28, the one-way valve 58 will automatically close the flow opening 54 through the gasket body 50 and thereby arrest this undesirable abnormal flow direction.

The one-way valve 58 is shown in one exemplary form in FIGS. 2 through 7 including a loose-piece fabricated frame 60 having a shape generally conforming to the coolant flow opening 54 formed in the gasket body 50. The frame 60 is fixedly joined to the gasket body 50 through an array of self-locking retention clips 62. The retention clips 62 have barbed ends which respond to insertion of the frame 60 into the flow opening 54 and resiliently snap into a secure gripping condition when the frame 60 has reached a working position. The frame 60 can be made from an injection molded plastic material, in which it is generally rigid or alternatively can be made from an elastomeric material in which its features are compressible and resilient. Alternatively, the frame 60 can be integrated onto the gasket body 50, without the need for a separate sub-assembly component operation.

Figures 5, 6:
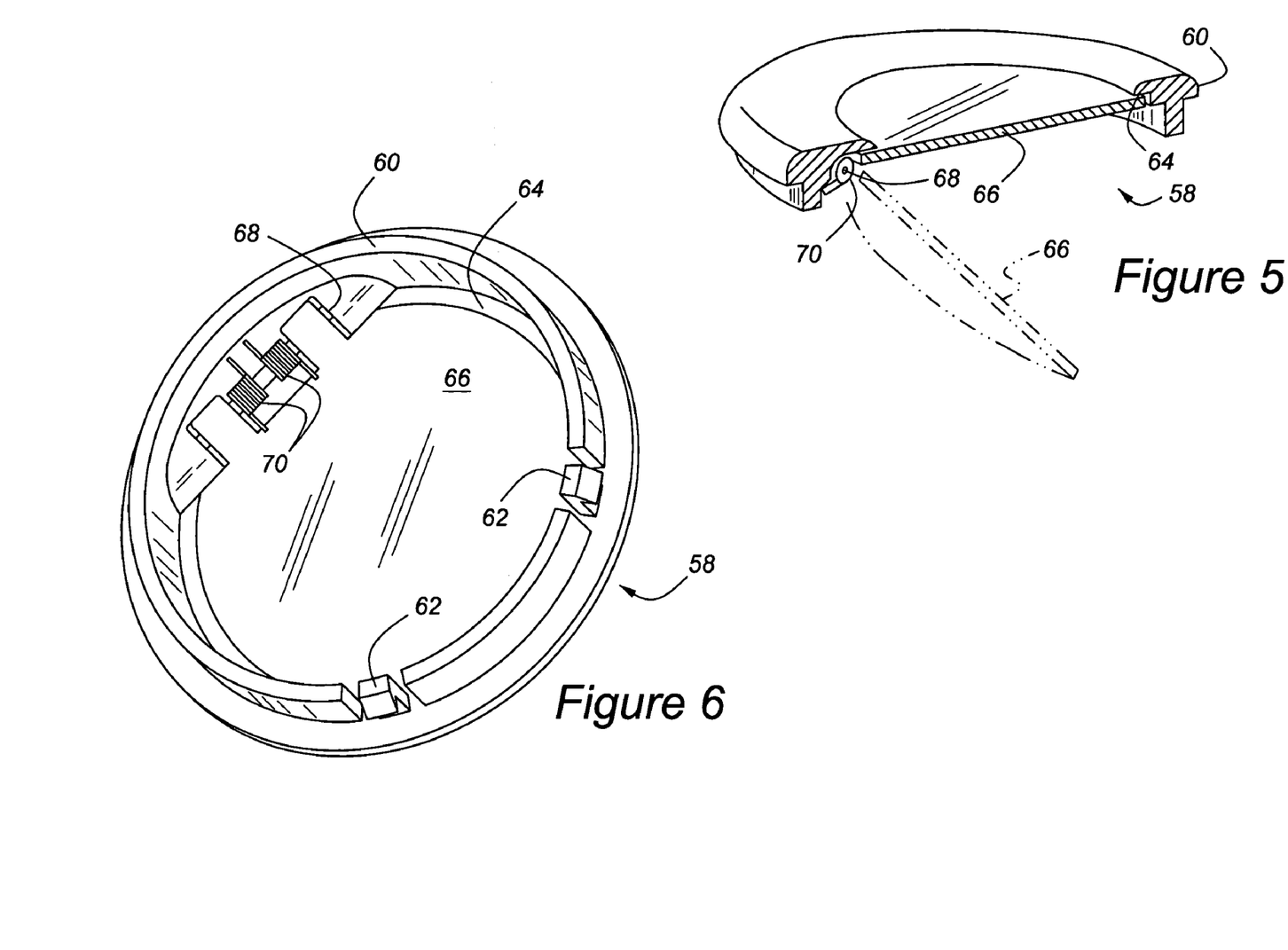
FIG. 5 is a perspective view of the subject one-way valve in cross-section showing the gate in a phantom open condition.
FIG. 6 is a perspective view of the underside of the one-way valve.
Figures 7, 8A, 8B, 9A, 9B, 10A, 10B:
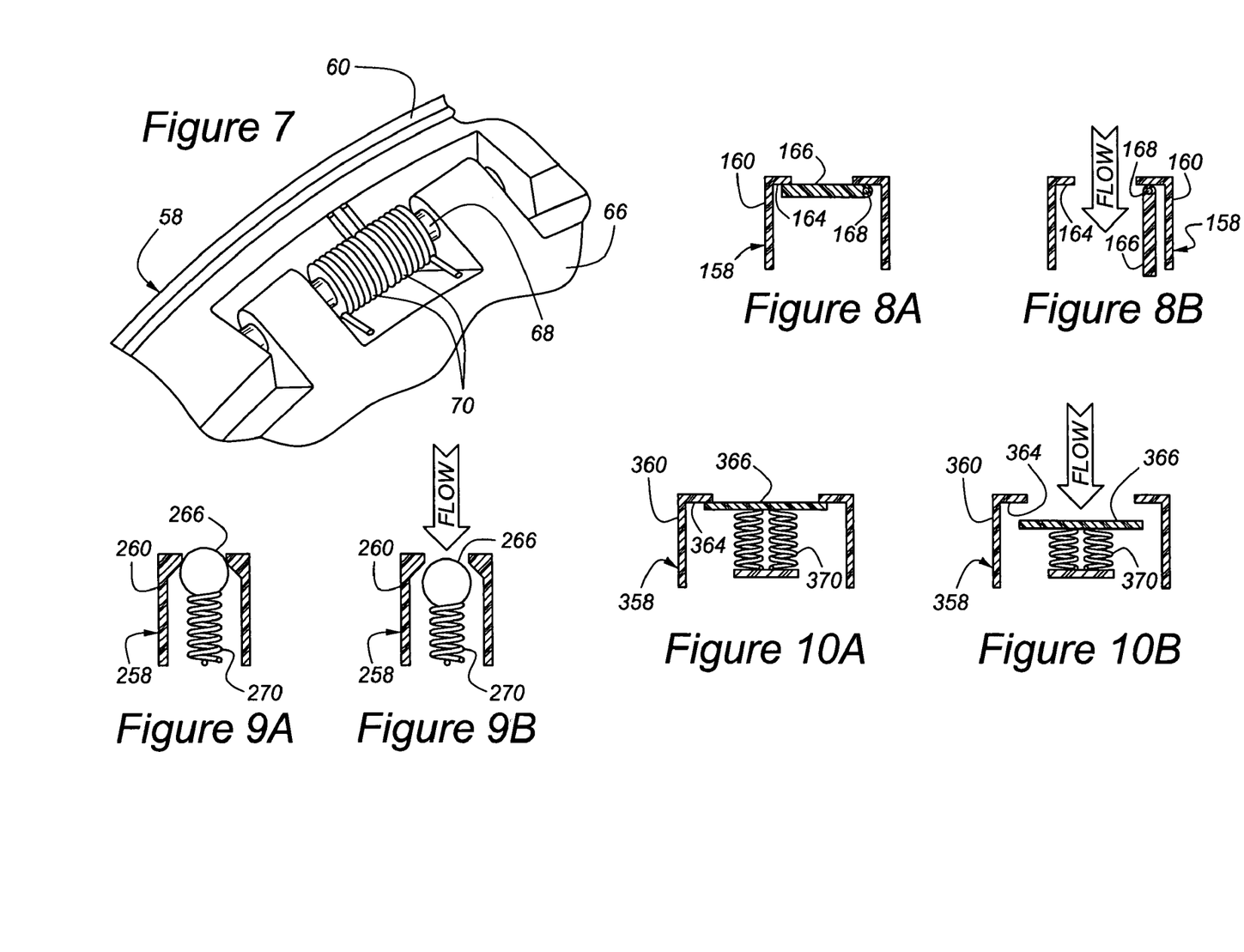
FIG. 7 is an enlarged perspective view showing the hinge and torsion spring configuration of the one-way valve.
FIGS. 8A and 8B are simplified cross-sectional views of an alternative embodiment of the one-way valve shown in closed and open positions, respectively.
FIGS. 9A and 9B are simplified cross-sectional views of a second alternative embodiment of the one-way valve shown in closed and open positions, respectively.
FIGS. 10A and 10B are simplified cross-sectional views of a third embodiment of the subject one-way valve shown in closed and open positions, respectively.

A valve seat 64 is formed in the frame 60 to establish an engagement surface for a movable gate 66 which is hingedly joined to the frame 60. Pivoting upon the hinge 68, the gate 66 swings toward and away from the valve seat 64. The gate hinge 68 supports a biasing member 70 in the form of a torsion spring which reacts against the frame 60 to urge the gate 66 normally toward the valve seat 64. In this condition, static and velocity pressure in the liquid coolant, when flowing the normal direction, will overcome the biasing force of the torsion spring and thereby open the one-way valve 58 to coolant flow through the flow opening 54. However, when the static and/or velocity pressure in the liquid coolant is insufficient in the normal direction to overcome the torsion spring, the one-way valve 58 will be urged toward a closed condition and thus prevent any abnormal flow of liquid coolant.

An alternative variation of the one-way valve 158 is shown in FIGS. 8A and 8B, wherein for convenience the prefix "1" is applied to reference numbers used in preceding examples to represent corresponding features. In this first alternative embodiment, the biasing member is eliminated, and the hinged gate 166 is responsive entirely to pressure in the liquid coolant to move between its open and closed positions. Flow in the normal direction is represented by the arrow in FIG. 8B.

A second alternative embodiment of the subject one-way valve is illustrated in FIGS. 9A and 9B. Here, the prefix "2" is used with previously established reference numbers to distinguish the components of this second alternative design. Here, the gate 266 takes the form of a spherical ball while the biasing member 270 comprises a simple compression spring. In this check-valve style arrangement, pressure in the liquid coolant flowing in the normal direction (FIG. 9B) urges the gate 266 against the biasing member 270 and away from the valve seat 264. However, when the liquid coolant is not flowing, or flowing in an abnormal direction, the biasing member 270 moves the gate 266 toward a closed position (FIG. 9A) and thereby prevents an undesirable flow condition within the engine block.

A third alternative embodiment of the subject one-way valve is shown in FIGS. 10A and 10B. Here, the prefix "3" is used in connection with previously introduced reference numerals to indicate like or corresponding parts. Here, the gate 366 comprises a plate supported against a biasing member 370 in the form of compression springs. In response to coolant flow in the normal direction (FIG. 10B), the gate 366 translates away from the valve seat 364 to provide an open flow condition. However, during periods of no flow or reverse flow, the biasing member 370 closes the one-way valve 358 to thereby automatically close the coolant flow opening 354 and thus prevent the flow of liquid coolant in abnormal direction.

The subject method prevents abnormal coolant flow in the internal combustion engine 20 through the steps of: providing an engine 20 having a circuitous coolant flow path 32 passing through the cylinder head 28 and the block 22. Liquid coolant is circulated through the flow path 32 in a normal direction under the influence of a pump 34. A head gasket 48 is compressed between the cylinder 28 and the block 22 to contain combustion gases. A coolant flow opening 54 is formed in the head gasket 48 and aligned with the flow path 32 to permit the movement of liquid coolant therethrough in the normal direction. The method advantageously includes the step of automatically blocking the flow opening 54 with a one-way valve 58 carried on the head gasket 48 to prevent coolant flow through the engine 20 in an abnormal direction. Because the liquid coolant is typically circulated through the flow path 32 in a direction which includes moving the liquid coolant from the cylinder head 28 toward the block 22, the one-way valve 58 automatically prevents the flow of liquid coolant in a reverse direction. Optionally, the step of automatically blocking the flow opening with the one way valve 58 may include biasing the one-way valve 58 toward a closed condition, and overcoming this biasing in response to movement of liquid coolant through the flow path 32 in the normal direction.

Other modifications and variations of the present invention will be readily appreciated by these skilled in the art. For example, the one-way valve can take any number of different forms and still provide the novel flow control functions here described. It is, therefore to be understood that invention has been described with words of description rather that of limitation. Accordingly, the invention is defined by the appended claims.

What is claimed is:

1. A head gasket for clamped retention between a cylinder head and a block in an internal combustion engine, said head gasket comprising:
    a gasket body;
    at least one cylinder bore opening formed in said gasket body;
    at least one coolant flow opening disposed in said gasket body for passing liquid coolant between the cylinder head and the block when the liquid coolant is flowing in a circuitous normal direction; and
    a one-way valve carried on said gasket body and automatically closing said coolant flow opening to prevent flow of the liquid coolant in an abnormal direction, said one-way valve includes a frame fixedly joined to said gasket body, said frame includes a self-locking retention clip.

2. The head gasket as set forth in claim 1 wherein said frame includes a valve seat.

3. A head gasket for damned retention between a cylinder head and a block in an internal combustion engine, said head gasket comprising:
    a gasket body;
    at least one cylinder bore opening formed in said gasket body;
    at least one coolant flow opening disposed in said gasket body for passing liquid coolant between the cylinder head and the block when the liquid coolant is flowing in a circuitous normal direction;
    a one-way valve carried on said gasket body and automatically closing said coolant flow opening to prevent flow of the liquid coolant in an abnormal direction, said one-way valve includes a frame fixedly joined to said gasket body, said frame includes a valve seat; and
    a gate hingedly joined to said frame for movement toward and away from said valve seat.

4. The head gasket as set forth in claim 3 wherein said one-way valve includes a biasing member for urging said gate toward said valve seat.

5. A head gasket for clamped retention between a cylinder head and a block in an internal combustion engine, said head gasket comprising:
    a gasket body;
    at least one cylinder bore opening formed in said gasket body;

at least one coolant flow opening disposed in said gasket body for passing liquid coolant between the cylinder head and the block when the liquid coolant is flowing in a circuitous normal direction;

a one-way valve carried on said gasket body and automatically closing said coolant flow opening to prevent flow of the liquid coolant in an abnormal direction; and a seat formed about said coolant flow opening, and said one-way valve including a gate moveable toward and away from said valve seat.

6. The head gasket as set forth in claim 5 wherein said one-way valve includes a biasing member for urging said gate toward said valve seat.

7. The head gasket as set forth in claim 6 wherein said gate comprises a plate.

8. The head gasket as set forth in claim 6 wherein said gate comprises a ball.

9. A liquid cooled internal combustion engine, said engine comprising:

a block having at least one combustion chamber formed therein;

a cylinder head fixed to said block and covering said combustion chamber;

a cooling system including a circuitous flow path for liquid coolant passing through said cylinder head and said block;

a pump in communication with said flow path for influencing movement of the liquid coolant in said cooling system to circulate in a normal direction;

at least one flow control valve disposed in said flow pat for selectively preventing the circulation of liquid coolant in portions of said cooling system;

a gasket body compressed between said cylinder head and said block, said gasket body including at least one cylinder bore opening aligned with said combustion chamber and at least one coolant flow opening aligned with said flow path;

and a one-way valve carried on said gasket body and automatically closing said coolant flow opening to prevent flow of the liquid coolant in an abnormal direction while allowing the flow of liquid coolant therethrough in the normal direction.

10. The engine as set forth in claim 9 wherein said one-way valve includes a frame fixedly joined to said gasket body.

11. The engine as set forth in claim 10 wherein said frame includes a self-locking retention clip gripping said gasket body.

12. The engine as set forth in claim 9 wherein said one-way valve is positioned to allow normal coolant flow through said flow opening from said cylinder head to said block, and to prevent the abnormal flow of the liquid coolant from said block to said cylinder head.

13. The engine as set forth in claim 12 further including a valve seat formed about said coolant flow opening, said one-way valve includes a gate hingedly joined to said frame for movement toward and away from said valve seat.

14. The engine as set forth in claim 13 wherein said one-way valve includes a biasing member for urging said gate toward said valve seat.

15. The engine as set forth in claim 12 further including a valve seat formed about said coolant flow opening, and said one-way valve including a gate moveable toward and away from said valve seat.

16. The engine as set forth in claim 15 wherein said one-way valve includes a biasing member for urging said gate toward said valve seat.

17. The engine as set forth in claim 16 wherein said gate comprises a plate.

18. The engine as set forth in claim 16 wherein said gate comprises a ball.

19. A method for preventing abnormal coolant flow in an internal combustion engine, said method comprising the steps of:

providing an engine having a circuitous coolant flow path passing through a cylinder head and a block;

circulating liquid coolant through the flow path in a normal direction;

compressing a head gasket between the cylinder head and the block to contain combustion gases;

forming a coolant flow opening in the head gasket, aligned with the flow path, to permit the movement of liquid coolant therethrough in the normal direction;

and automatically blocking the flow opening with a one-way valve carried on the head gasket to prevent coolant flow through the engine in an abnormal direction.

20. The method of claim 19 wherein said step of circulating liquid coolant through the flow path in the normal direction includes moving the liquid coolant from the cylinder head to the block.

21. The method of claim 19 wherein said step of automatically blocking the flow opening with a one-way valve includes biasing the one-way valve toward a closed condition, and overcoming the said step of biasing in response to movement of liquid coolant through the flow path in the normal direction.

* * * * *

UNITED STATES PATENT AND TRADEMARK OFFICE
CERTIFICATE OF CORRECTION

| | | |
|---|---|---|
| PATENT NO. | : 7,137,361 B2 | Page 1 of 1 |
| APPLICATION NO. | : 11/157539 | |
| DATED | : November 21, 2006 | |
| INVENTOR(S) | : Daniel J. Vialard et al. | |

It is certified that error appears in the above-identified patent and that said Letters Patent is hereby corrected as shown below:

Column 3, line 34: "cylinder head 26" should read --cylinder head 28--.

Column 4, line 35: "coolant in circulated" should read --coolant is circulated--.

Column 6, line 42: "A head gasket for damned" should read --A head gasket for clamped--.

Signed and Sealed this

Seventeenth Day of April, 2007

JON W. DUDAS
*Director of the United States Patent and Trademark Office*